(12) United States Patent
Gehrke et al.

(10) Patent No.: US 12,406,110 B2
(45) Date of Patent: Sep. 2, 2025

(54) COMPUTER-IMPLEMENTED METHOD FOR LOW-LATENCY GENERATION AND INPUT OF SENSOR DATA INTO A CONTROL UNIT OR INTO CONTROL UNIT NETWORKS

(71) Applicant: dSPACE digital signal processing and control engineering GmbH, Paderborn (DE)

(72) Inventors: Matthias Gehrke, Paderborn (DE); Gregor Sievers, Paderborn (DE); Christian Lindemann, Paderborn (DE); Carsten Scharfe, Paderborn (DE); Christopher Wiegand, Paderborn (DE)

(73) Assignee: DSPACE GMBH, Paderborn (DE)

( * ) Notice: Subject to any disclaimer, the term of this patent is extended or adjusted under 35 U.S.C. 154(b) by 994 days.

(21) Appl. No.: 17/394,437

(22) Filed: Aug. 5, 2021

(65) Prior Publication Data

US 2022/0043411 A1 Feb. 10, 2022

(30) Foreign Application Priority Data

Aug. 7, 2020 (DE) .................... 10 2020 120 840.5

(51) Int. Cl.
*G06F 30/20* (2020.01)
*G05B 17/02* (2006.01)
(Continued)

(52) U.S. Cl.
CPC ............ *G06F 30/20* (2020.01); *G05B 17/02* (2013.01); *G05B 23/0205* (2013.01); *G06F 2111/10* (2020.01)

(58) Field of Classification Search
CPC ..... G06F 30/20; G06F 2111/10; G05B 17/02; G05B 23/0205; G05B 2219/23446
See application file for complete search history.

(56) References Cited

U.S. PATENT DOCUMENTS 10,707,984 B2 * 7/2020 Pitigoi-Aron ............ H04Q 9/04
10,877,152 B2 * 12/2020 Van Fleet ................ G01S 17/90
(Continued)

FOREIGN PATENT DOCUMENTS

CN 109932926 A * 6/2019
CN 112997060 A * 6/2021 ............ G01M 17/06
(Continued)

OTHER PUBLICATIONS

"Autonomous Vehicle Testing and Validation Platform: Integrated Simulation System with Hardware in the Loop", Chen et al., 2018 IEEE Intelligent Vehicle Symposium (IV), pp. 949-956 (Year: 2018).*

(Continued)

*Primary Examiner* — Eunhee Kim
(74) *Attorney, Agent, or Firm* — Leydig, Voit & Mayer, Ltd.

(57) ABSTRACT

A method for low-latency generation and input of sensor data for control units or control unit networks includes: computing, by a simulator system or device, environmental data sets at a simulation frequency using an environment model of a virtual environment scene, wherein each environmental data set is associated with a respective point in time in an overall simulation time at which point in time the respective environment data set is available for further processing; and executing, by the simulator system or device or by at least one additional system or device, at least one sensor simulation model, wherein the at least one sensor simulation model generates sensor data sets at a sampling frequency, based on the environmental data sets, for further processing by at least one control unit, wherein each sensor data set is associated with a respective start time and respective time of completion in the overall simulation time.

9 Claims, 4 Drawing Sheets

Exemplary configuration of the processing units that implement the inventive method (51) Int. Cl.
  *G05B 23/02* (2006.01)
  *G06F 111/10* (2020.01)

(56) References Cited

U.S. PATENT DOCUMENTS

| | | | |
|---|---|---|---|
| 2011/0066262 A1* | 3/2011 | Kelly | G05B 23/0267 |
| | | | 703/17 |
| 2015/0339994 A1 | 11/2015 | Verbeure | |
| 2015/0348509 A1 | 12/2015 | Verbeure et al. | |
| 2016/0056905 A1 | 2/2016 | Hartlmueller et al. | |
| 2019/0164518 A1 | 5/2019 | Dimitrov | |
| 2020/0192327 A1* | 6/2020 | Khoo | G05B 19/4069 |

FOREIGN PATENT DOCUMENTS

| | | | | |
|---|---|---|---|---|
| DE | 102012023395 A1 | 6/2014 | | |
| DE | 102015108424 A1 | 2/2015 | | |
| DE | 102015108057 A1 | 11/2015 | | |
| DE | 102013218622 B4 | 8/2016 | | |
| DE | 102013219581 B4 | 11/2016 | | |
| DE | 102016119538 A1 * | 4/2018 | | G06F 19/00 |
| DE | 102018130037 A1 | 5/2019 | | |
| EP | 2402827 B1 | 1/2015 | | |
| EP | 2622839 B1 | 4/2018 | | |

OTHER PUBLICATIONS

"A Novel Integrated Simulation and Testing Platform for Self-Driving Cars with Hardware in the Loop", Chen et al., IEEE Transaction on Intelligent Vehicles, vol. 4, No. 3, pp. 425-436 (Year: 2019).*

Anonymous, "White Paper", Amd Project Freesync, Mar. 2014, pp. 1-7, AMD, Santa Clara, California.

* cited by examiner

FIG. 1: Basic sequence of the sensor data generation by the method of the invention FIG. 2: Exemplary sequence of the sensor data generation by the method of the invention FIG. 3: Exemplary configuration of the processing units that implement the inventive method FIG. 4: Further embodiment of the sequence of the sensor data generation by the method of the invention

COMPUTER-IMPLEMENTED METHOD FOR LOW-LATENCY GENERATION AND INPUT OF SENSOR DATA INTO A CONTROL UNIT OR INTO CONTROL UNIT NETWORKS

CROSS-REFERENCE TO PRIOR APPLICATIONS

This application claims benefit to German Patent Application No. DE 10 2020 120 840.5, filed on Aug. 7, 2020, which is hereby incorporated by reference herein.

FIELD

The invention relates to a computer-implemented method for low-latency generation and input of sensor data into a control unit (e.g., a controller) or into control unit networks (e.g., controller networks). Methods of this type are used to test virtual or real control units or control unit networks for sensor systems, such as are used in the automotive field or in aerospace applications. Such control units and control unit networks are used for radar-, lidar-, camera- or ultrasound-based sensors and are tested by hardware-in-the-loop (HIL) or software-in-the-loop (SIL) testing. The invention also relates to a computer program product having a computer program including software for carrying out the method.

The method can also be used in the field of development and validation of safety-critical control units, such as performed by automotive suppliers. This also applies to the subgroup of control units which are used for driver assistance systems. Such units find application in park assist systems, lane keeping and emergency brake assist systems, adaptive cruise control systems, and many other systems. Today, high demands are placed on control units, especially in the field of vehicle environment sensing using sensor technology. The number of sensors installed in vehicles increases with the quest for autonomous driving functions, and thus also the number of control units installed in a vehicle.

These systems have in common that they depend on accurate sensing of the vehicle environment by sensors. The control units of the type in question here process sensor data from environment-sensing sensors. These sensors typically sense their environment via electromagnetic waves or, in the case of ultrasound-based systems, via sound waves. Examples of environment-sensing sensors are cameras. Other examples are radar and lidar sensors, which sense their environment through active scanning and analysis of reflected signals. The present invention is not limited with respect to whether the tested sensors are based on active or passive principles. The present invention is also not limited with respect to the nature of the environmental signals used.

BACKGROUND

The evaluation of control units is often performed by HIL or SIL testing in an open-loop or closed-loop system. In either case, the environment of the control unit(s) to be tested is modeled by a simulation; any existing sensors are also simulated up to a certain point in the active chain. The simulation takes place on a computer system which, depending on the particular application, is equipped with processing units and real-time operating systems or may also have powerful graphics processing units (GPUs) and field-programmable gate arrays (FPGAs). This computer system is usually and hereinafter referred to as a simulator.

In the open-loop variant, either a prototype of the control unit—i.e., a control unit that exists in reality—or a simulated control unit is stimulated via a suitable interface with the sensor data artificially generated by the simulation, and it is checked whether the output of the control unit or of the algorithm to be tested on the simulated control unit meets the expectations. In the closed-loop variant, the loop is closed via the control unit; i.e., the output of the control unit to be tested is fed back to the simulator, where it can influence the state of the simulation. The control unit to be tested may possibly request output data from other control units that are not available at the time of the test. These can then be integrated via a restbus simulation. Such a closed-loop system gives the control unit to be tested the impression that it is installed in a real vehicle and is under way in the real environment in order to evaluate the interaction of the various components.

At an early stage in the development process, the focus is on virtual validation, and thus on early testing of the control unit software. These tests are performed before the electronic control unit is tested in its intended location and even before a prototype of the future control unit hardware is available. Testing at this early stage is done by performing software-in-the-loop (SIL) simulations, which allow the completed code to be productively tested in a virtual environment without having control unit hardware available. If, as in the present case, sensor control units are concerned, accurate simulation of sensor data is advantageous. This includes, for example, the computation of the virtual environment scene in a form expected by the sensor control unit. In the case of camera control units, for example, the expected form is camera images; in the case of lidar control units, it is a reflected point cloud adapted to the particular measuring technology used. The sensor data is computed from the virtual environment scene using sensor simulation models. For this purpose, a SIL simulation environment is utilized in which the vehicle's environment (environment model) and the sensor data is simulated and which delivers the generated sensor data to the control unit code for processing.

At a more advanced stage in the development process, a control unit prototype is already available, so that this prototype is to be tested together with the control unit software. To this end, it is preferred to perform hardware-in-the-loop (HIL) simulations. Again, an environment model of the vehicle's environment is executed, including sensor data simulation, on a simulator, and the behavior of the control unit software in this vehicle environment is examined. In the case of HIL simulation, it is provided that the simulation meet certain real-time conditions. This is advantageous because the control unit, when in its intended location (in the vehicle), interacts with the environment and should promptly respond to it. Therefore, the output data computed by the simulation in response to the input data of the control unit should be delivered by the simulator within a specified time interval—often in the single-digit millisecond range.

EP 2402827 B1 describes a method and device for functional testing of an object recognition device of a motor vehicle. This laid-open application proposes a sensor simulator that simulates a camera. An environment simulator transmits environmental data from which sensor signals are computed. In this connection, camera-related effects, such as optical distortion of the imaging optics, can also be taken into account.

Thus, an overall simulation includes, inter alia, a plurality of computation cycles, which in turn include generation of environmental data, generation of sensor data based on the environmental data, and transmission to the virtual or real control unit to be tested.

In known methods, sensor data is generated as fast as possible based on environmental data. However, since each computation cycle has a fixed length, generated sensor data is stored in an output memory of the simulator processing unit or of another processing unit and is transmitted to the control unit to be tested at the end of the computation cycle; i.e., at a later time in the overall simulation time. Thus, in known methods, control units to be tested or processing units that perform further processing use data which is older than necessary.

SUMMARY

In an exemplary embodiment, the present invention provides a method for low-latency generation and input of sensor data for control units or control unit networks. The method includes: computing, by a simulator system or device, environmental data sets at a simulation frequency using an environment model of a virtual environment scene, wherein each environmental data set is associated with a respective point in time in an overall simulation time at which point in time the respective environment data set is available for further processing; and executing, by the simulator system or device or by at least one additional system or device, at least one sensor simulation model, wherein the at least one sensor simulation model generates sensor data sets at a sampling frequency, based on the environmental data sets, for further processing by at least one control unit, wherein each sensor data set is associated with a respective start time and a respective time of completion in the overall simulation time, and wherein a respective sensor data set is stored in an output memory of the simulator system or device or of the at least one additional system or device, while waiting for transmission to the at least one control unit for further processing for a time interval between the respective time of completion and a respective time of transmission for the respective sensor data set, and wherein the respective time of transmission is associated with a point in time in the overall simulation. The method further includes: in each computation cycle in the overall simulation time, measuring and reducing or increasing a time interval between time of completion and time of transmission relative to a previous time interval between time of completion and time of transmission.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an exemplary embodiment, the invention provides a computer-implemented method for low-latency generation and input of sensor data into a control unit or into control unit networks. In another exemplary embodiment, the invention provides a computer program product and a computer-readable storage medium containing instructions which, when executed by a computer, cause the computer to execute a method in accordance with an exemplary embodiment of the invention.

In an exemplary embodiment, the invention provides a method which provides for continuously executing an environment model of a virtual environment scene at a simulation frequency on a simulator processing unit, and for obtaining environmental data sets as output from the environment model. The simulation frequency for the environmental data should be greater than or equal to the highest sampling frequency of at least one sensor simulation model. The sensor simulation models output sensor data of a nature that is expected by the respective sensor to be served and models the environmental data as the respective sensor would perceive the virtual environment scene. The simulator processing unit (which may also be referred to as a simulator system or device) may be a specialized HIL simulator system having a real-time operating system, but may also be a commercially available computer.

The environment model of a virtual environment scene includes all the geometric information of the environmental objects present in the surroundings relative to the position of the control unit(s) to be tested, such as information about the roadway, including guardrails and roadside trees, obstacles, and vehicles creating a traffic situation. The environment model is executed periodically continuously at a simulation frequency, and thus generates a sequence of changing discrete states of the environment model, which are reflected in the environmental data sets. The sequence of environmental data sets follow one another in succession along the overall simulation time, which is the time that forms the basis for all computations. Accordingly, each individual environmental data set is associated with a point in time in the overall simulation time.

The generated environmental data sets are executed in at least one sensor simulation model on the simulator processing unit or on at least one additional processing unit, and the at least one sensor simulation model continuously generates sensor data at a sampling frequency, based on the environmental data sets, for further processing by a control unit. In this process, each generated sensor data set is associated with a start time at which the generation begins and a time of completion at which the generation is completed in the respective computation cycle in the overall simulation time. The sensor simulation models output sensor data of a nature that is expected by the respective sensor to be served and models the environmental data as the respective sensor would perceive the virtual environment scene.

The generated sensor data is stored in the output memory of the simulator processing unit or on at least one additional processing unit (which may also be referred to as at least one additional system or device) for a time interval until the generated sensor data is transmitted to a processing unit that performs further processing (which may be the simulator processing unit or the at least one additional processing unit or another system or device).

In order to keep the time interval as short as possible and thereby provide the processing unit that performs further processing with sensor data based on the most up-to-date environmental data possible, the time interval is gradually reduced with each computation cycle. The gradual reduction is performed until only a risk buffer remains as the time interval. If no new sensor data should be available at the time of transmission, the data from the previous computation cycle is transmitted. In this case, the time interval is then gradually increased in the next computation cycle to ensure the generation of up-to-date sensor data.

Exemplary embodiments of the present invention achieve low-latency generation and input of sensor data into a control unit or into control unit networks.

As indicated above, an advantageous embodiment provides for gradually reducing the time interval between the time of completion and the time of transmission of the sensor data generated based on environmental data. The gradual reduction is performed until only a risk buffer remains as the time interval.

In another preferred embodiment of the invention, the size of the risk buffer is adjustable by a user. This makes it possible to adjust the extent to which low-latency input of sensor data into a processing unit that performs further processing becomes more relevant, or to reduce the likelihood that no new sensor data is available in a computation cycle and data from the previous computation cycle must be transmitted.

In a further advantageous embodiment of the method, the time interval between the completion of the generated sensor data and the transmission of the sensor data is varied for testing purposes. For testing, accurate simulation of the sensor data is advantageous. This includes, for example, the computation of the virtual environment scene in a form expected by the sensor control unit. In this process, the sensor data is computed from the virtual environment scene using sensor simulation models, as mentioned earlier.

In order to enable test scenarios with small latencies between the completion of the sensor data and the transmission of the sensor data and with large latencies between the completion of the sensor data and the transmission of the sensor data in the following computation cycle, the time interval should be configurable in each computation cycle. This makes it possible to test thresholds of the respective latencies and effects for the control unit to be tested.

In another advantageous embodiment of the invention, the environment model is executed in response to a request by the sensor simulation model, and thus models only the relevant discrete state of the environment model, thereby making available the environmental data set that is utilized for the generation of the sensor data by the sensor simulation model at the desired point in time. This approach also has the advantage of preventing unnecessary transmission of environmental data sets that cannot be processed.

The transmission of environmental data sets may involve a high data-processing load, especially if the generation of environmental data sets is executed on a different computer system than the sensor simulation models.

The invention will now be described in more detail with reference to the drawings, in which like elements are designated by identical reference numerals. The embodiments shown are highly schematic.

Figure 1:
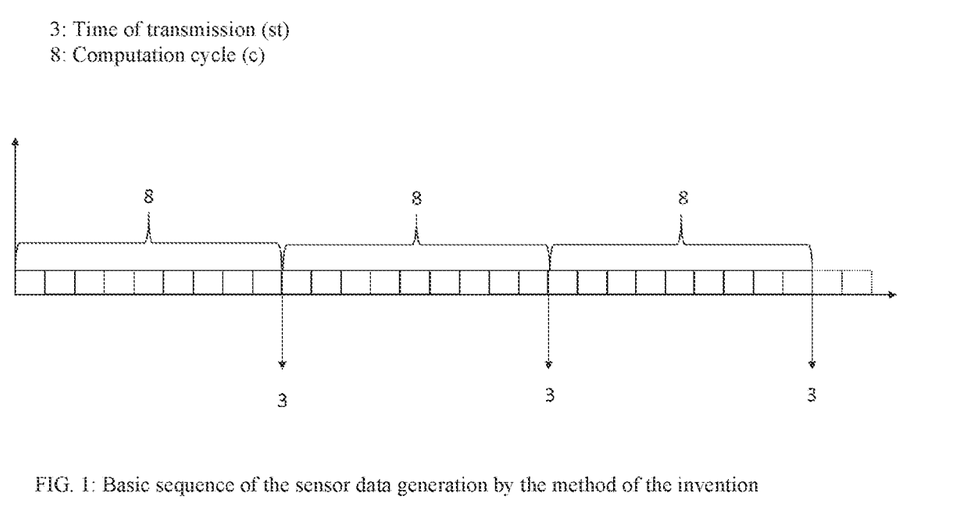
FIG. 1 illustrates a basic sequence of sensor data generation in an exemplary embodiment of the invention.

FIG. 1 shows a basic sequence of sensor data generation in an exemplary embodiment of the invention. More particularly, FIG. 1 shows a timing diagram of the overall simulation time, which includes a plurality of computation cycles (8), each ending with a time of transmission (st).

Figure 2:
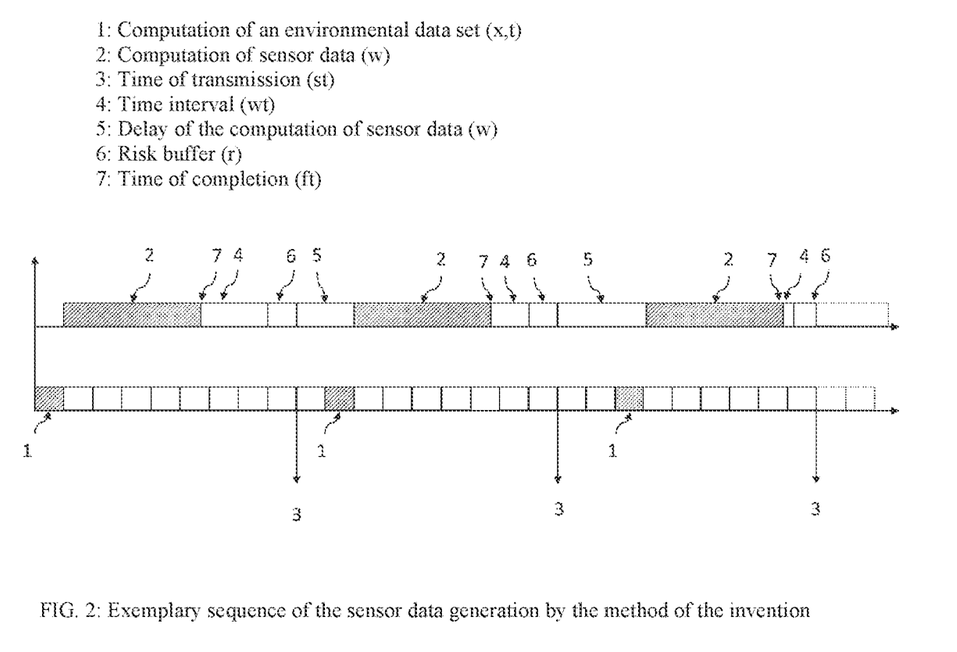
FIG. 2 shows a detailed sequence of sensor data generation in an exemplary embodiment of the invention.

FIG. 2 shows a detailed sequence of sensor data generation in an exemplary embodiment of the invention. In this process, an environment model (1) of a virtual environment scene is computed on a simulator processing unit, and environmental data sets (x,t) are continuously generated at the simulation frequency.

Sensor data (w) is generated based on an environmental data set (x,t) at a time (t) in the overall simulation. The computation (2) of sensor data (w) is completed at a time of completion (ft) in the overall simulation. The completed sensor data is then present in an output memory (m) of the simulator processing unit or of the at least one additional processing unit. The waiting time of sensor data (w) in output memory (m) is made up of the sum of time interval (wt) and risk buffer (r). A computation cycle (8) ends with the transmission of sensor data (w) at a time of transmission (st), which represents a point in time (t) in the overall simulation.

Then, in the next computation cycle (8), the computation (2) of sensor data (w) is delayed for a time (5), so that in the current computation cycle (8), a specific data set (x,t) of the continuously generated environmental data sets (x,t) that is generated at a later time (t) is used for the computation (2) of sensor data (w). This shortens time interval (wt) and reduces the latency for a processing unit that performs further processing.

This procedure is continued in the next computation cycle until only a risk buffer (r) remains as the waiting time in output memory (m) after the time of completion (ft) of sensor data (w).

Figure 3:
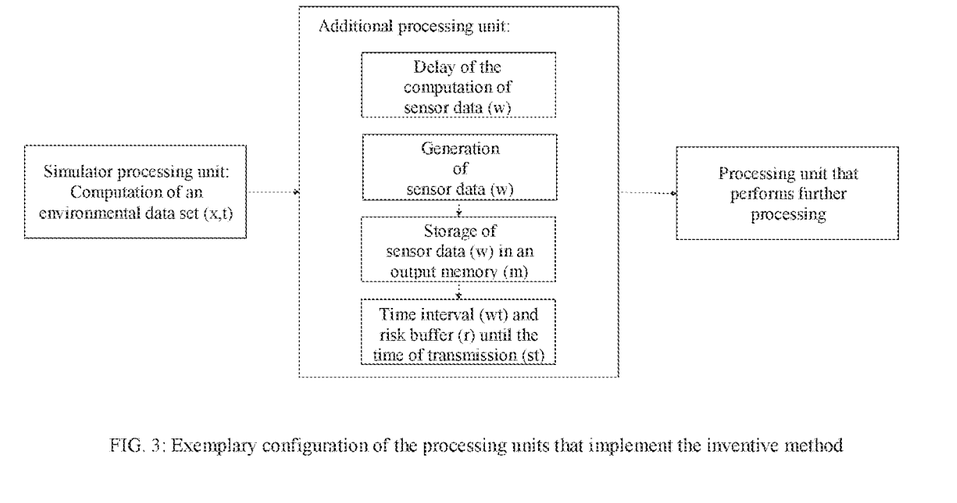
FIG. 3 shows an example of a configuration of processing units in an exemplary embodiment of the invention.

FIG. 3 shows an example of a configuration of processing units in an exemplary embodiment of the invention. Here, an environment model of a virtual environment scene is computed on a simulator processing unit, and environmental data sets (x,t) are continuously generated at the simulation frequency.

The generation of sensor data (w) based on an environmental data set (x,t) is performed on another processing unit. Thus, this processing unit performs the steps of delaying (5) the computation of sensor data (w), generating (2) sensor data (w), storing sensor data (w) in output memory (m), and waiting the time interval (wt) and the time of risk buffer (r) until the time of transmission (st). At the time of transmission (st), sensor data (w) is transmitted to a processing unit that performs further processing.

Figure 4:
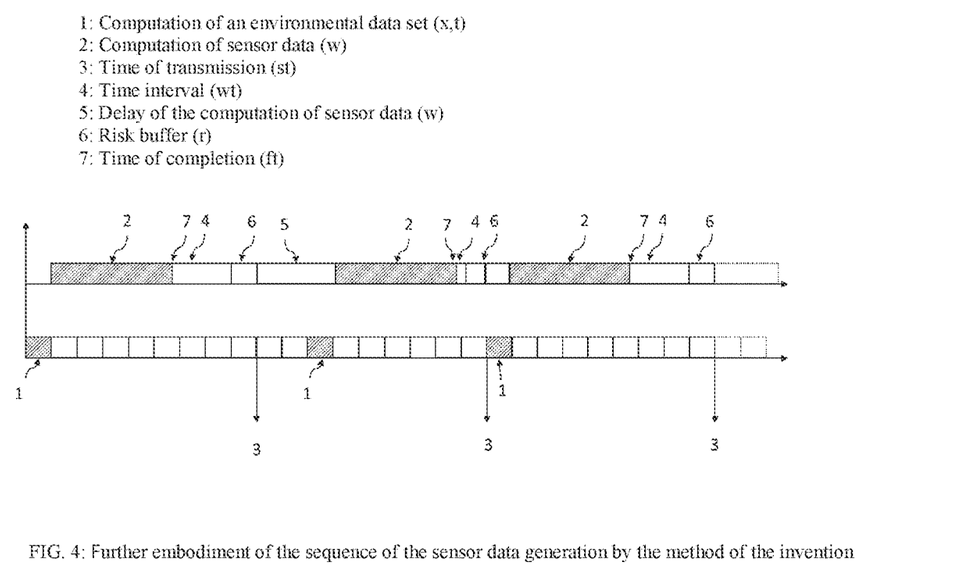
FIG. 4 shows another exemplary embodiment of a sequence of sensor data generation.

Another embodiment of the invention is shown in FIG. 4. Here, initially, environmental data sets (x,t) are continuously generated at the simulation frequency in first computation cycle (8). This is followed by initiating the computation (2) of sensor data (w) based on an environmental data set (x,t). This results in a long time interval (wt) in the first computation cycle, as a result of which sensor data (w) remains longer in output memory (m) of the simulator processing unit or of the at least one additional processing unit. In the next computation cycle, a longer delay (5) of the computation (2) of sensor data (w) is seen. In order to change, for test cases, between large and small latencies for the processing unit that performs further processing, both the time interval (wt) and the risk buffer (r) can be adaptively varied, for example, by a user.

Limit values for the waiting time of sensor data (w) in output memory (m) can be examined, for example, by large changes between computation cycles (8). Relevant test cases can also be generated by the reduction of risk buffer (r) to zero.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 computation of an environmental data set (x,t)
2 computation of sensor data (w)
5 delay of the computation of sensor data (w)
8 computation cycle
ft time of completion of the computation of sensor data (w)
m output memory of the simulator processing unit or of at least one additional processing unit
r risk buffer
sst start time of the computation of sensor data (w)
st time of transmission of sensor data (w)
t point in time in the overall simulation
w sensor data
wt time interval that the sensor data waits in output memory (m)
X,t environmental data set

The invention claimed is:

1. A system for testing a controller using a simulator system, comprising:
the simulator system, wherein the simulator system is configured to generate sensor data corresponding to a simulated environment; and
the controller, wherein the controller is configured to obtain the sensor data from the simulator system and to perform control operations in response thereto; and
wherein the simulator system is configured to perform a plurality of sensor data generation cycles, wherein each of the plurality of sensor data generation cycles comprises:
generating respective sensor data corresponding to a respective environmental data set corresponding to a respective point in time;
storing the respective sensor data for a respective waiting time interval configured by the simulator system; and
after the respective waiting time interval, sending the respective sensor data to the controller for further processing;
wherein the plurality of sensor data generation cycles includes a first sensor data generation cycle and a second sensor data generation cycle, wherein the second sensor data generation cycle follows the first sensor data generation cycle, and wherein the simulator system reduces the waiting time interval over the first and second sensor data generation cycles such that the second sensor data generation cycle has a shorter respective waiting time interval than the first sensor data generation cycle.

2. The system according to claim 1, wherein the simulator system is configured to reduce the waiting time interval over multiple successive sensor data generation cycles until the waiting time interval reaches a minimum time interval.

3. The system according to claim 2, wherein the minimum time interval is adjustable by a user of the simulator system.

4. The system according to claim 1, wherein the respective sensor data includes radar data, lidar data, or camera image data.

5. The system according to claim 1, wherein, for a further sensor data generation cycle after the plurality of sensor data generation cycles, no new sensor data is available after a respective waiting time interval for the further sensor data generation cycle, and sensor data of a previous sensor data generation cycle relative to the further sensor data generation cycle is transmitted to the controller for further processing in the further sensor data generation cycle.

6. The system according to claim 5, wherein based on new sensor data being available after the respective waiting time interval for the further sensor data generation cycle, the simulator system is configured to increase the waiting time interval for a next sensor data generation cycle following the further sensor data generation cycle.

7. The system according to claim 1, wherein a step size for reducing the waiting time interval is adjustable by a user of the simulator system.

8. One or more non-transitory computer-readable mediums having processor-executable instructions stored thereon for testing a controller using a simulator system, wherein the processor-executable instructions, when executed, facilitate performance of the following:
performing, by the simulator system, a plurality of sensor data generation cycles, wherein the simulator system is configured to generate sensor data corresponding to a simulated environment, and wherein the controller is configured to obtain the sensor data from the simulator system and to perform control operations in response thereto;
wherein each of the plurality of sensor data generation cycles comprises:
generating respective sensor data corresponding to a respective environmental data set corresponding to a respective point in time;
storing the respective sensor data for a respective waiting time interval configured by the simulator system; and
after the respective waiting time interval, sending the respective sensor data to the controller for further processing;
wherein the plurality of sensor data generation cycles includes a first sensor data generation cycle and a second sensor data generation cycle, wherein the second sensor data generation cycle follows the first sensor data generation cycle, and wherein the simulator system reduces the waiting time interval over the first and second sensor data generation cycles such that the second sensor data generation cycle has a shorter respective waiting time interval than the first sensor data generation cycle.

9. A method for testing a controller using a simulator system, wherein the method comprises:
performing, by the simulator system, a plurality of sensor data generation cycles, wherein the simulator system is configured to generate sensor data corresponding to a simulated environment, and wherein the controller is configured to obtain the sensor data from the simulator system and to perform control operations in response thereto;
wherein each of the plurality of sensor data generation cycles comprises:
generating respective sensor data corresponding to a respective environmental data set corresponding to a respective point in time;
storing the respective sensor data for a respective waiting time interval configured by the simulator system; and
after the respective waiting time interval, sending the respective sensor data to the controller for further processing;
wherein the plurality of sensor data generation cycles includes a first sensor data generation cycle and a second sensor data generation cycle, wherein the second sensor data generation cycle follows the first sensor data generation cycle, and wherein the simulator system reduces the waiting time interval over the first and second sensor data generation cycles such that the second sensor data generation cycle has a shorter respective waiting time interval than the first sensor data generation cycle.

* * * * *